United States Patent
Inoue (10) Patent No.: US 10,243,396 B2
(45) Date of Patent: Mar. 26, 2019

(54) CONTROL DEVICE, POWER CONTROL SYSTEM, AND POWER CONTROL METHOD

(75) Inventor: Hiroshi Inoue, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 1267 days.

(21) Appl. No.: 14/112,515

(22) PCT Filed: Apr. 16, 2012

(86) PCT No.: PCT/JP2012/060294
§ 371 (c)(1),
(2), (4) Date: Oct. 17, 2013

(87) PCT Pub. No.: WO2012/144473
PCT Pub. Date: Oct. 26, 2012

(65) Prior Publication Data
US 2014/0049053 A1 Feb. 20, 2014

(30) Foreign Application Priority Data

Apr. 18, 2011 (JP) .................. 2011-092528

(51) Int. Cl.
*H02J 9/00* (2006.01)
*H02J 3/38* (2006.01)
*H02J 7/35* (2006.01)

(52) U.S. Cl.
CPC ........... *H02J 9/002* (2013.01); *H02J 3/38* (2013.01); *H02J 3/383* (2013.01); *H02J 7/35* (2013.01); *Y02E 10/563* (2013.01); *Y02E 10/566* (2013.01)

(58) Field of Classification Search
None
See application file for complete search history.

(56) References Cited

U.S. PATENT DOCUMENTS

| 4,982,569 A | 1/1991 | Bronicki |
| 2003/0180583 A1 | 9/2003 | Ichikawa et al. |
| 2005/0200205 A1* | 9/2005 | Winn .................. H02J 9/062 307/64 |

(Continued)

FOREIGN PATENT DOCUMENTS

| JP | 11-69634 A | 3/1999 |
| JP | 2002-063927 A | 2/2002 |

(Continued)

OTHER PUBLICATIONS

Office Action dated Feb. 2, 2016 by the Japanese Patent Office for Japanese Patent Application No. 2015-046531.

(Continued)

*Primary Examiner* — Carlos R Ortiz Rodriguez
(74) *Attorney, Agent, or Firm* — Procopio Cory Hargreaves and Savitch LLP (57) ABSTRACT

An HEMS 700 provided in a consumer having a gas power-generator 220 requiring start-up power for starting power generation and power supply means (PV 100, storage battery 200, PCS 400, distribution board 500) for supplying power to a load 300, and controlling the gas power-generator 220 and the power supply means, detects supply power that can be supplied by the power supply means; and controls the power supply means such that the supply power does not fall below the start-up power of the gas power-generator 220.

10 Claims, 7 Drawing Sheets

(56) References Cited

U.S. PATENT DOCUMENTS

2010/0141442 A1    6/2010  Matsuyama et al.

FOREIGN PATENT DOCUMENTS

| JP | 2002-152976 A | 5/2002 |
|---|---|---|
| JP | 2003-68339 A | 3/2003 |
| JP | 2003-092844 A | 3/2003 |
| JP | 2004-328960 A | 11/2004 |
| JP | 2007-228728 A | 9/2007 |
| JP | 2008-22650 A | 1/2008 |
| JP | 2009-232670 A | 10/2009 |
| JP | 2011-036101 A | 2/2011 |
| WO | 2008/152798 A1 | 12/2008 |

OTHER PUBLICATIONS

The extended European search report issued by the European Patent Office dated Sep. 16, 2014, which corresponds to European Patent Application No. 12774469.6-1806 and is related to U.S. Appl. No. 14/112,515.

Communication pursuant to Rules 70(2) and 70a(2) EPC issued by the European Patent Office dated Oct. 6, 2014, which corresponds to European Patent Application No. 12774469.6-1806 and is related to U.S. Appl. No. 14/112,515.

An Office Action; "Notice of Reason for Rejection," issued by the Japanese Patent Office dated Aug. 12, 2014, which corresponds to Japanese Patent Application No. 2013-511003 and is related to U.S. Appl. No. 14/112,515; with English language statement of relevance.

International Search Report for PCT/JP2012/060294 dated Jul. 24, 2012.

Written Opinion for PCT/JP2012/060294 dated Jul. 24, 2012.

\* cited by examiner

CONTROL DEVICE, POWER CONTROL SYSTEM, AND POWER CONTROL METHOD

TECHNICAL FIELD

The present invention relates to a control device, a power control system and a power control method that control power supply means provided in a consumer.

BACKGROUND ART

In recent years, as a distributed power-generator that generates power in a consumer, a photovoltaic cell (PV) and a gas power-generator are widely used (See PTL 1, for example). The gas power-generator includes a household fuel cell using city gas or propane gas.

Also, an increasing number of cases are assumed where a storage battery is introduced, in the consumer, for charging power from a power system during night time when the power rate is low and for supplying (discharging) the power to a load during daytime.

CITATION LIST

Patent Literature

PTL 1: Japanese Patent Publication No. H11-69634

SUMMARY OF THE INVENTION

Further, in recent years, a capacity of the power system to supply the power is reduced due to large-scale earthquakes, which results in a series of power outages. When the earthquake or the like occurs, a gas power-generator performs an operation to stop the power generation because a gas meter shuts off the gas supply.

However, when the power outage of the power system occurs due to the earthquake or the like, it is desirable to perform an "independent operation" of by the gas power-generator to supply the power to the load. However, there is a problem that the power generation cannot be started during the power outage because the gas power-generator requires start-up power to start up a heater and an auxiliary machine (various types of pumps and the like).

Therefore, it is an object of the present invention to provide a control device, a power control system, and a power control method with which it is possible to start the power generation during the power outage by a power-generator requiring the start-up power.

In order to solve the aforementioned problem, the present invention has following features.

First, the feature of a control device according to the present invention is summarized as follows. A control device (e.g., HEMS 700) provided in a consumer having a first power-generator (e.g., gas power-generator 220) requiring start-up power for starting power generation and power supply means (e.g., PV 100, storage battery 200, PCS 400 and distribution board 500) for supplying power to a load (load 300), and controlling the first power-generator and the power supply means, comprises: a power detection unit (power detection unit 711A) that detects supply power that can be supplied by the power supply means; and a control unit (control unit 712A) that controls the power supply means such that the supply power does not fall below the start-up power of the first power-generator.

In the aforementioned feature, the control device further comprises a power outage detection unit (power outage/stop detection unit 711C) that detects a power outage of a power system, wherein when the power outage is detected and when the first power-generator stops the power generation, the control unit controls the supply power to be supplied preferentially to the first power-generator.

In the aforementioned feature, the control device further comprises a temperature detection unit (temperature detection unit 711B) that detects a temperature according to the first power-generator, or a stop time detection unit (power outage/stop detection unit 711C) that detects a stop time of the first power-generator, wherein after the start-up power of the first power-generator is corrected on the basis of the detected temperature or the stop time, the control unit controls the power supply means such that the supply power does not fall below the start-up power after the correction.

In the aforementioned feature, the control device further comprises an operation schedule determination unit (operation schedule determination unit 714A) that determines a during-independent-operation schedule that is an operation schedule of the load during an independent operation, when the power outage is detected and when the independent operation by the power supply means and the first power-generator is performed, wherein the operation schedule determination unit determines the during-independent-operation schedule, on the basis of a period when the independent operation is performed, each power supply status of the power supply means and the first power-generator, and a status of the load.

In the aforementioned feature, the power supply means includes a storage battery (storage battery 200) that stores the power to be supplied to the load, the supply power includes accumulated power that is power stored in the storage battery, and the control unit controls a charge and discharge of the storage battery such that the supply power including the accumulated power does not fall below the start-up power of the first power-generator.

In the aforementioned feature, the power supply means further includes a second power-generator (e.g., PV 100) that requires no start-up power for starting the power generation, and when the power outage is detected and when the supply power does not satisfy the start-up power of the first power-generator, the control unit controls the power acquired by the power generation of the second power-generator to be charged preferentially to the storage battery such that the supply power satisfies the start-up power of the first power-generator.

In the aforementioned feature, the first power-generator is a fuel cell device including at least any of an auxiliary machine and a heater, and the control unit controls the power supply means such that the supply power is supplied to at least any of the auxiliary machine and the heater.

The feature of a power control system according to the present invention is summarized as follows. A power control system provided in a consumer having a first power-generator (e.g., gas power-generator 220) requiring start-up power for starting power generation and power supply means (e.g., PV 100, storage battery 200, PCS 400 and distribution board 500) for supplying power to a load (load 300), and having a control device (e.g., HEMS 700) that controls the first power-generator and the power supply means, comprises: a power detection unit (power detection unit 711A) that detects supply power that can be supplied by the power supply means; and a control unit (control unit 712A) that controls the power supply means such that the supply power does not fall below the start-up power of the first power-generator.

The feature of a power control method according to the present invention is summarized as follows. A power control method of controlling a first power-generator and power supply means, in a consumer having the first power-generator that requires start-up power for starting power generation and the power supply means for supplying power to a load, comprises: a detection step of detecting supply power that can be supplied by the power supply means, and a control step of controlling the power supply means such that the supply power does not fall below the start-up power of the first power-generator.

DESCRIPTION OF THE EMBODIMENT

With reference to the drawings, the embodiment of the present invention will be described. In the drawings of the embodiments, the same or similar reference signs are applied to the same or similar portions.

Figure 1:
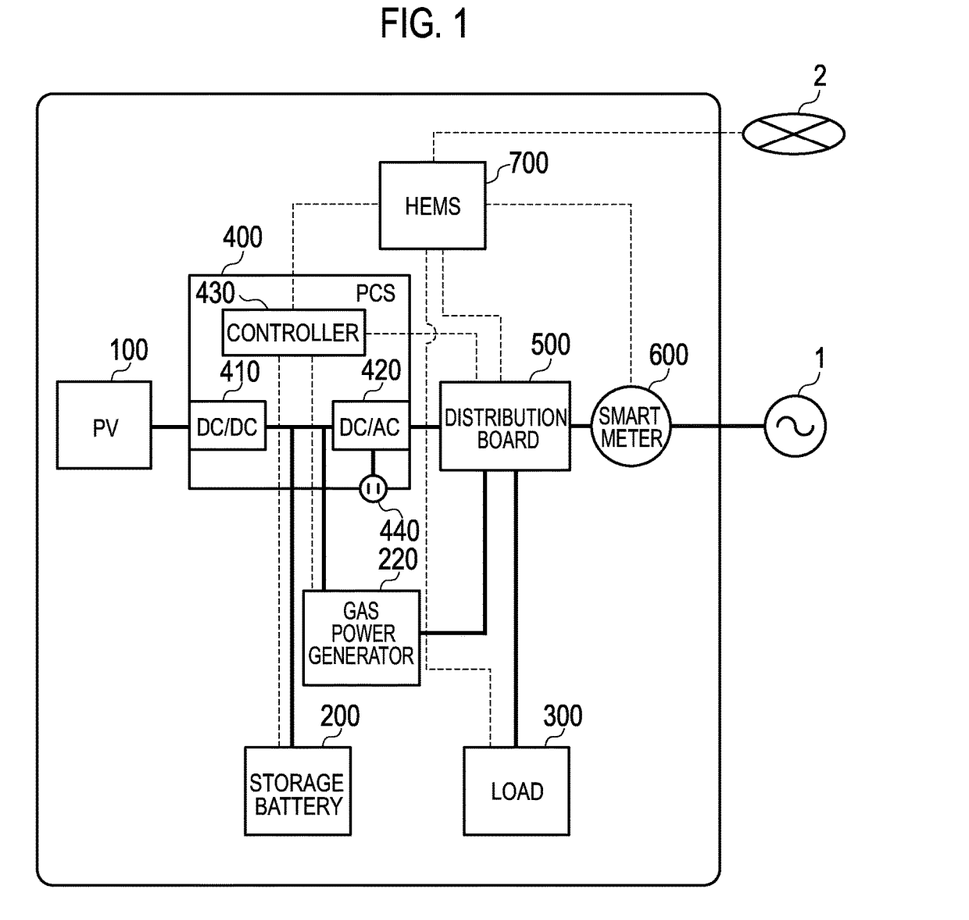
FIG. 1 is a diagram showing the entire configuration of a power control system according to the embodiment of the present invention.

FIG. 1 is a diagram showing the entire configuration of a power control system according to the present embodiment. In the following figures, power lines are shown by thick lines, and control signal lines are shown by broken lines. Note that, the control signal line may not just be a wired line but a wireless line.

As shown in FIG. 1, the power control system according to the present embodiment is provided with a photovoltaic cell (PV) 100, a storage battery 200, a gas power-generator 220, a power conditioner (PCS) 400, a distribution board 500, a smart meter 600, and HEMS 700, in the consumer which receives the supply of AC power from a power system 1 of an electric power company.

The PV 100 receives sunlight to generate power and outputs DC power acquired by the power generation (hereinafter, PV generated power) to the PCS 400 via the power line provided between the PCS 400 and the PV 100. Note that, the PV 100 is configured by one panel or a plurality of panels. Also, the PV 100 may be configured by using a plurality of strings configured by a plurality of panels.

The storage battery 200 stores the power, and outputs the DC power acquired by a power discharge (hereinafter, storage battery discharge power) to the PCS 400 and is charged with the DC power from the PCS 400, via the power line provided between the PCS 400 and the storage battery 200. Also, via the control signal line provided between the PCS 400 and the storage battery 200, the storage battery 200 outputs information indicating the accumulated power to the PCS 400, and a control signal for charging or discharging is inputted to the storage battery 200.

The gas power-generator 220 is a household fuel cell which generates power by using city gas or propane gas inputted via a gas line which is not shown. The gas power-generator 220 outputs the DC power acquired by the power generation (hereinafter, gas generated power) to the PCS 400 via the power line provided between the PCS 400 and the gas power-generator 220. In the present embodiment, in the gas power-generator 220, a temperature sensor (not shown) for measuring the peripheral temperature of the gas power-generator 220 is provided. Via the control signal line provided between the PCS 400 and the gas power-generator 220, a control signal for controlling the power generation is inputted to the gas power-generator 220, and the gas power-generator 220 outputs a temperature measurement value and a driving-stop time to the PCS 400.

The gas power-generator 220 corresponds to a first power-generator requiring the start-up power to start up the heater or the auxiliary machine (various types of pumps and the like). The AC power is inputted to the gas power-generator 220 via the power line provided between the distribution board 500 and the gas power-generator 220, and the gas power-generator 220 starts up when the inputted AC power reaches the start-up power. The heater includes an ignition heater, an electric heater and the like to ignite a burner for heating a fuel cell module such as a cell stack. The auxiliary machine includes a pump which transports the fuel, a blower, a CPU which controls the pump and the blower and the like.

The AC power is supplied to a load 300 via the power line provided between the distribution board 500 and the load 300, and the load 300 consumes the supplied AC power for operation. The load 300 may be one or plural. In the load 300, not just household electrical appliances such as lighting, an air conditioner and a refrigerator, and television, but a heat accumulator and the like can be included. Also, the load 300 is configured to be able to communicate with the HEMS 700, and configured to switch to a power saving mode in response to a control command from the HEMS 700.

The PCS 400 has a function of converting the DC power acquired by the power generation of the PV 100 and the power discharge of the storage battery 200 to the AC and outputting the AC, and a function of converting the AC power from the power system 1 to the DC and outputting the DC. Such PCS 400 can be referred to as a hybrid PCS. The PCS 400 performs input and output of the AC power between the distribution board 500, via the power line provided between the distribution board 500 and the PCS 400. Also, the PCS 400 outputs the DC power for charging the storage battery 200 to the storage battery 200, via the power line provided between the storage battery 200 and the PCS 400.

The PCS 400 has a DC/DC converter 410, a DC/AC converter 420, a controller 430, and a socket 440 for the independent operation. However, the PCS 400 may not have the socket 440 for the independent operation.

The DC/DC converter 410 performs DC/DC conversion on the PV generated power, and under control of the controller 430, outputs the DC power to the storage battery 200 and/or the DC/AC converter 420.

The DC/AC converter 420 converts the DC power that the DC/DC converter 410 outputs, and/or the storage battery discharge power to the AC and outputs these powers to the distribution board 500, under the control of the controller 430. Also, when the load is connected to the socket 440 for the independent operation, the DC/AC converter 420 outputs the AC power to the socket 440 for the independent operation under the control of the controller 430. Further, the DC/AC converter 420 converts the AC power inputted from the distribution board 500 to DC and outputs the DC to the storage battery 200, under the control of the controller 430.

The controller 430 controls various types of functions of the PCS 400, and is configured by using a CPU or a memory. Also, the controller 430 transmits and receives various types of control signals to and from the HEMS 700. Specifically, the controller 430 acquires a measurement value of the PV generated power, a measurement value of the gas generated power, a measurement value of the power that the storage battery 200 stores (hereinafter, storage battery-accumulated power), and a measurement value of the power that the socket 440 for the independent operation supplies, and notifies the HEMS 700 of these measurement values. When the controller 430 detects a power-generation stop of the gas power-generator 220, the controller 430 notifies the HEMS 700 of a control signal indicating the same.

Also, the controller 430 controls the charging and discharging of the storage battery 200 and adjusts the PV generated power, in accordance with the control command received from the HEMS 700. Note that, a user interface unit which receives an input from a user may be connected to the controller 430.

The socket 440 for the independent operation supplies the power to the load during the independent operation. However, the socket 440 for the independent operation is provided not just at the PCS 400, but sometimes provided apart from the PCS 400 via the power line.

The distribution board 500 distributes the power under the control of the controller 430 of the PCS 400 and/or HEMS 700. When the AC power that the PCS 400 outputs is less than power consumption of the load 300, the distribution board 500 receives a shortfall of the AC power from the power system 1, and supplies the load 300 with the AC power that the PCS 400 outputs and the AC power received from the power system 1. Also, if the AC power that the PCS 400 outputs exceeds the power consumption of the load 300, the distribution board 500 transmits (sells) an excess of the AC power to the power system 1.

Note that, an operation state that supplies the load 300 with both powers of the power from the PCS 400 and the power from the power system 1 is referred to as a "linkage operation", and an operation state that supplies the load 300 with only the power from the PCS 400 is referred to as an "independent operation." During the power outage of the power system 1 (hereinafter merely referred to as a "power outage"), the distribution board 500 performs a parallel-off from the power system 1, and switches from the linkage operation to the independent operation.

Note that, for a switching from the linkage operation to the independent operation, there are a method for replugging the load 300 in the socket 440 for the independent operation, and a method that the distribution board 500 performs an automatic switching. In the following, a case where the distribution board 500 performs the automatic switching is mainly described.

During the independent operation, to the load 300, the PV generated power and the storage battery discharge power are supplied via the PCS 400 and the distribution board 500. Namely, in the present embodiment, the PV 100, the storage battery 200, the PCS 400, and the distribution board 500 configure power supply means that supply the load 300 with the power.

The smart meter 600 is provided on the power line between the power system 1 and the distribution board 500, measures selling and buying electric power that are inputted and outputted to and from the power system 1, and notifies the HEMS 700 of the measurement values. Also, the smart meter 600 communicates with an external network 2, transmits the measurement values of the selling and buying electric power to the external network 2, and receives power rate information and the like. When the smart meter 600 (or the PCS 400) detects the power outage, the smart meter 600 (or the PCS 400) transmits a control signal indicating the same to the HEMS 700.

The HEMS 700 is the one for performing power management within the consumer, and has a function of controlling each device within the consumer by transmitting various types of control commands to the PCS 400 and the distribution board 500, and a function of collecting various types of measurement values and monitoring and displaying a state of the each device within the consumer. Also, the HEMS 700 determines an operation schedule of the load 300, and performs a control according to the determined operation schedule. In the present embodiment, the HEMS 700 corresponds to the control device that controls the power supply means (the PV 100, the storage battery 200, the PCS 400 and the like) and the load 300. Note that, the HEMS 700 may acquire information for use in the control from the external network 2 by communicating with the external network 2.

Figure 2:
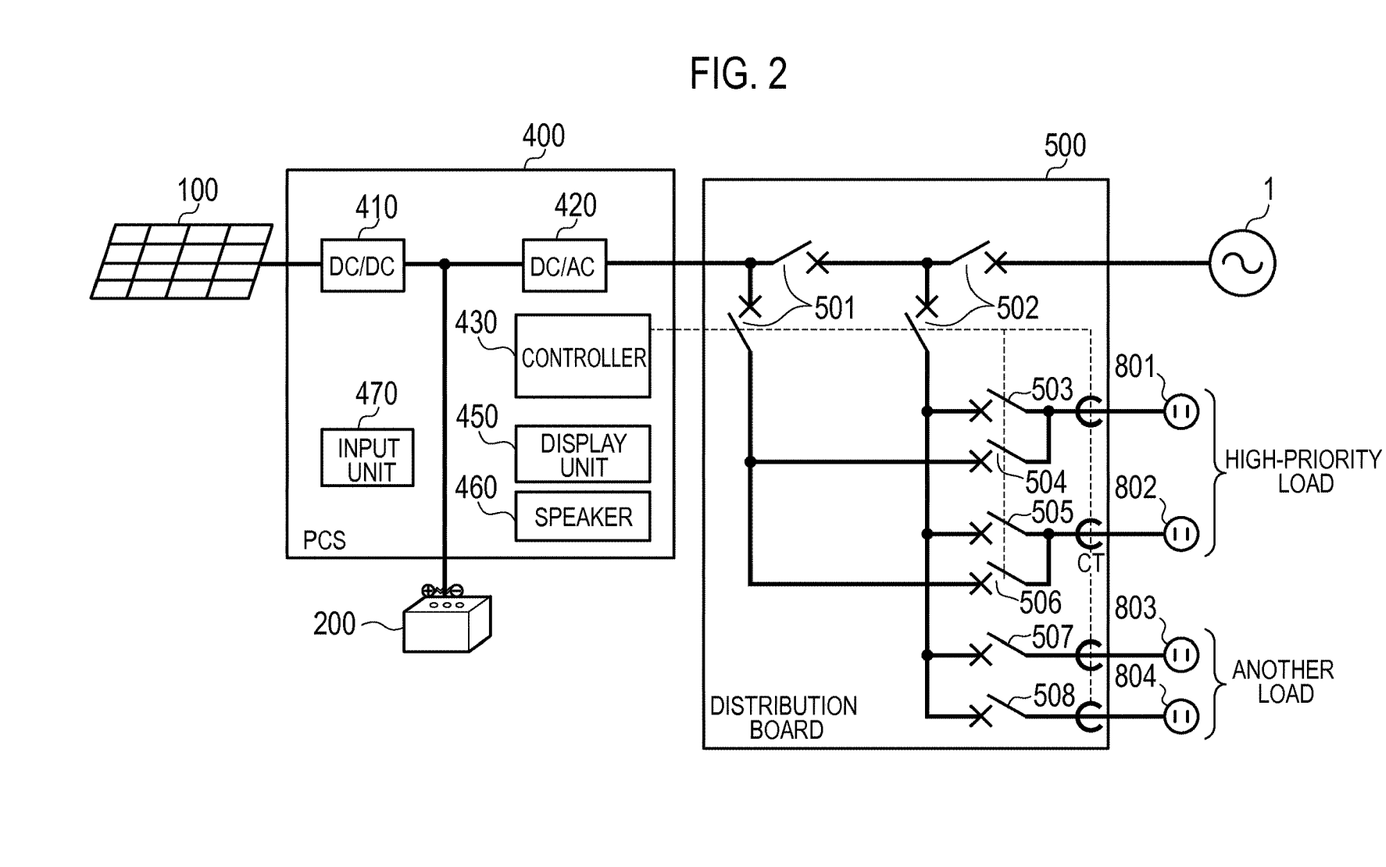
FIG. 2 is a diagram showing a detailed configuration example 1 of the PCS and the distribution board according to the embodiment of the present invention.

Next, a detailed configuration of the PCS 400 and the distribution board 500 is described. FIG. 2 is a diagram showing a detailed configuration example 1 of the PCS 400 and the distribution board 500.

As shown in FIG. 2, the PCS 400 according to the present configuration example has a display unit 450 and a speaker 460 in addition to the DC/DC converter 410, the DC/AC converter 420, and the controller 430. In case of the power outage, the display unit 450 performs a display that it is during the power outage, under the control of the controller 430. Also, in case of the power outage, the speaker 460 performs an audio output that it is during the power outage, under the control of the controller 430. Further, an input unit 470 may be provided, which is capable of inputting a planned power outage period and designating a load priority and the like described below.

Also, the distribution board 500 according to the present configuration example has a function of performing a parallel-off from the power system 1, and a function of switching between supplying power and not supplying power for each of sockets 801 to 804 during the independent operation. Specifically, the distribution board 500 has a service breaker 501, a master breaker 502, power switches 503 to 508, and a power consumption sensor CT.

The service breaker 501, the master breaker 502, and the power switches 503 to 508 turn on or off under the control of the controller 430 of the PCS 400. The power sensor CT measures the power that the loads (for example, lighting and a refrigerator) connected to the sockets 801 to 804 consume, and notifies the controller 430 of the measurement values.

When the power has been acquired from the power system 1, the controller 430 turns each of the service breaker 501 and master breaker 502 to the on-state, for example, in response to the control command from the HEMS 700. By this, the power becomes capable of being supplied to the loads connected to the sockets 801 to 804.

On the contrary, when switching to the independent operation due to the power outage, the controller 430 turns the master breaker 502 to the off-state (parallel off) as the controller 430 keeps the service breaker 501 in the on-state, for example, in response to the control command from the HEMS 700. By this, although the AC power that the PCS 400 outputs becomes capable of being supplied to the loads connected to the sockets 801 and 802, the power becomes incapable of being supplied to the loads connected to the sockets 803 and 804.

Therefore, by connecting high-priority loads to the sockets 801 and 802, during the independent operation, the power can be supplied to these high-priority loads.

Figure 3:
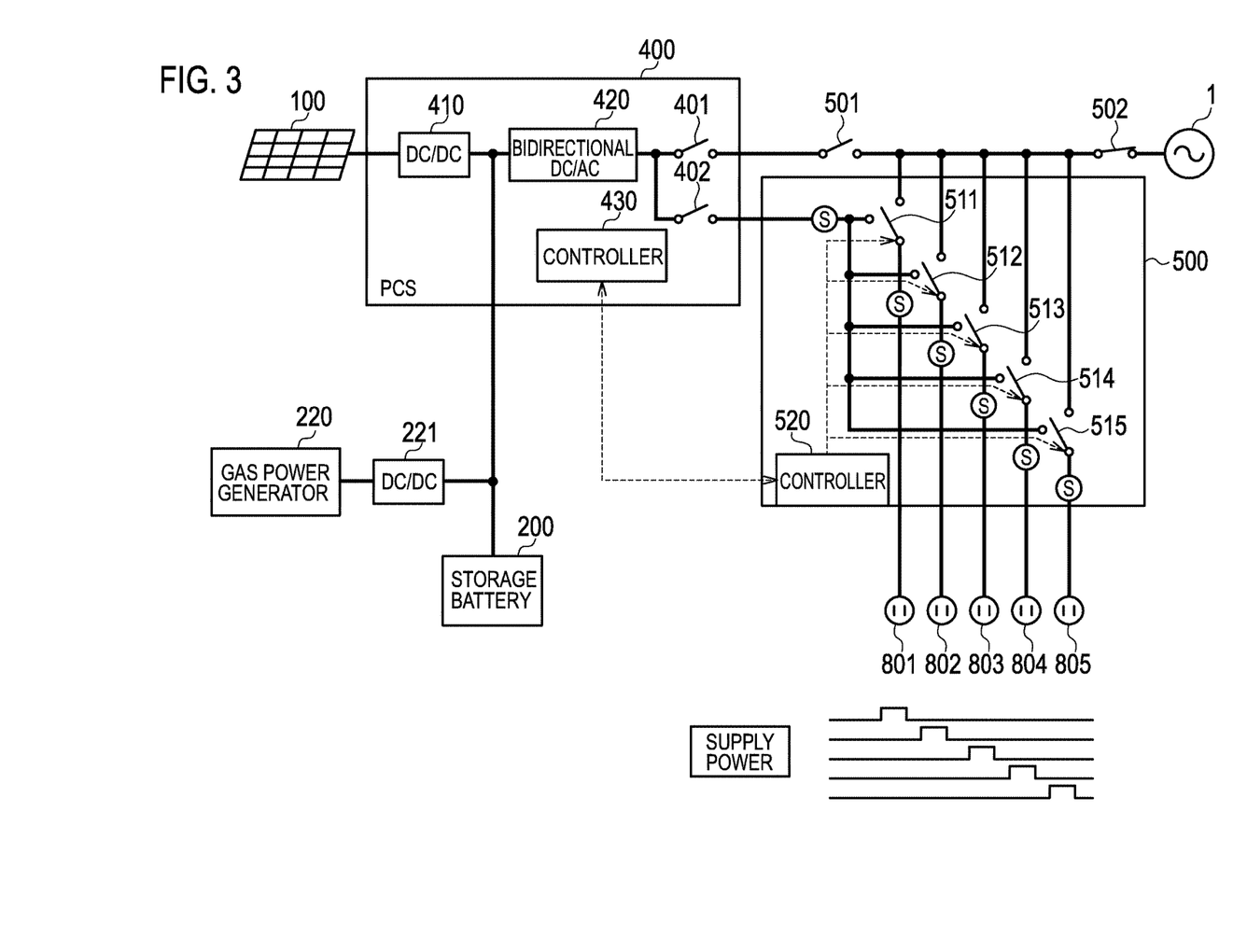
FIG. 3 is a diagram showing a detailed configuration example 2 of the PCS and the distribution board according to the embodiment of the present invention.

FIG. 3 is a diagram showing a detailed configuration example 2 of the PCS 400 and the distribution board 500.

As shown in FIG. 3, the PCS 400 according to the present configuration example is similar to the configuration example 1 in terms of having the DC/DC converter 410, the bidirectional DC/AC converter 420, and the controller 430, but differs from the configuration example 1 in terms of having power switches 401 and 402. Also, the distribution board 500 according to the present configuration example is similar to the configuration example 1 in terms of having the service breaker 501 and the master breaker 502, but differs from the configuration example 1 in terms of having a controller 520, and power switches 511 to 515 provided in each of the sockets 801 to 805. Further, in the present configuration example, a power consumption sensor S is provided in each of the sockets 801 to 805, and the controller 520 collects each measurement value and notifies the controller 430 of the PCS 400 of the values. Note that, in FIG. 3, the signal lines connecting the controller 520 and the power consumption sensors S are omitted.

When the power has been acquired from the power system 1, the controller 430 turns each of the power switch 401, the service breaker 501, and the master breaker 502 to the on-state, for example, in response to the control command from the HEMS 700, controls the power switch 402 to be turned to the off-state, and controls to switch each of the power switches 511 to 515 to the power system 1 side. By this, the power becomes capable of being supplied to the loads connected to the sockets 801 to 805.

On the contrary, when switching to the independent operation due to the power outage, the controller 430 turns the power switch 401, the service breaker 501, and the master breaker 502 to the off-state, for example, in response to the control command from the HEMS 700, and controls the power switch 402 to be turned to the on-state. By having the power switches 401 and 402 within the PCS 400 as in the present embodiment, the power control for the loads during the independent operation can be performed within the PCS 400.

Also, the controller 520 controls to sequentially (cyclically) switch the power switches 511 to 515 to the on-state as shown in the lower part of FIG. 3, for example, in response to an instruction from the controller 430. That is, the controller performs control such that time for which the power is capable to be supplied is assigned sequentially (cyclically) to the sockets 801 to 805. By this, because supplying the power to more than two loads at the same time is prevented, the power consumption in a plurality of loads connected to each of the sockets 801 to 805 can be dispersed in time (leveled out). In the following, such a control is referred to as a "power leveling control". Note that, the assigned time intervals may be from a few minutes to several tens of minutes, and the power may be supplied continuously to the load that requires continuing power supply.

Figure 4:
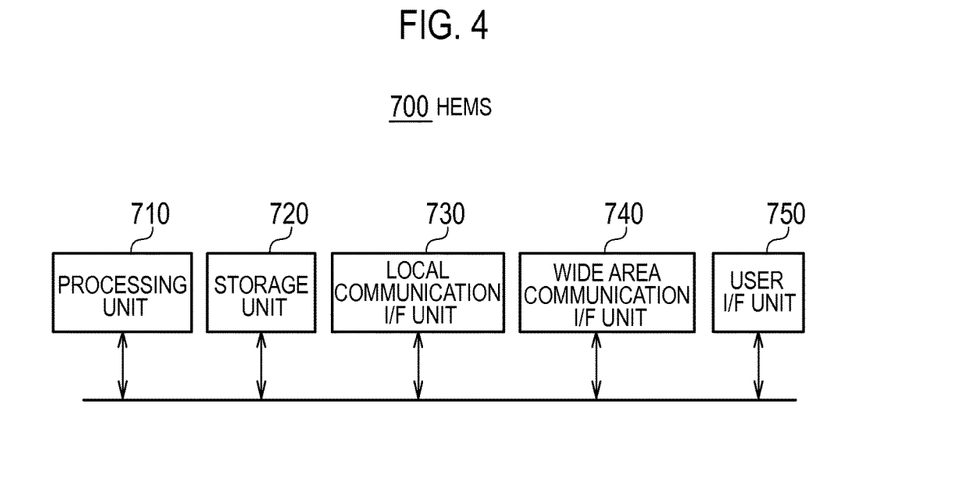
FIG. 4 is a configuration diagram of the HEMS according to the embodiment of the present invention.

Next, a detailed configuration of the HEMS 700 is described. FIG. 4 is a configuration diagram of the HEMS 700.

As shown in FIG. 4, the HEMS 700 has a processing unit 710, a storage unit 720, a local communication I/F unit 730, a wide area communication I/F unit 740, and a user I/F unit 750. The processing unit 710, the storage unit 720, the local communication I/F unit 730, the wide area communication I/F unit 740, and the user I/F unit 750 exchange information via a bus line or a LAN.

The processing unit 710 is configured by, for example, a CPU, and controls various types of functions of the HEMS 700 by executing a control program stored in the storage unit 720. Also, the processing unit 710 performs an independent operation control described below. A functional block configuration of the processing unit 710 will be described below.

The storage unit 720 is configured by, for example, an RAM or a nonvolatile memory, and stores each type of information to be used in the control, for example, of the HEMS 700.

The local communication I/F unit 730 is a communication I/F for communicating with each device within the consumer. The local communication I/F unit 730 communicates via Zigbee (registered trademark) or Ethernet (registered trademark), for example.

The wide area communication I/F unit 740 is a communication I/F for communicating with the external network 2.

The user I/F unit 750 is configured by including an input unit that receives an input from the user, and a display unit that performs various types of displays.

Figure 5:
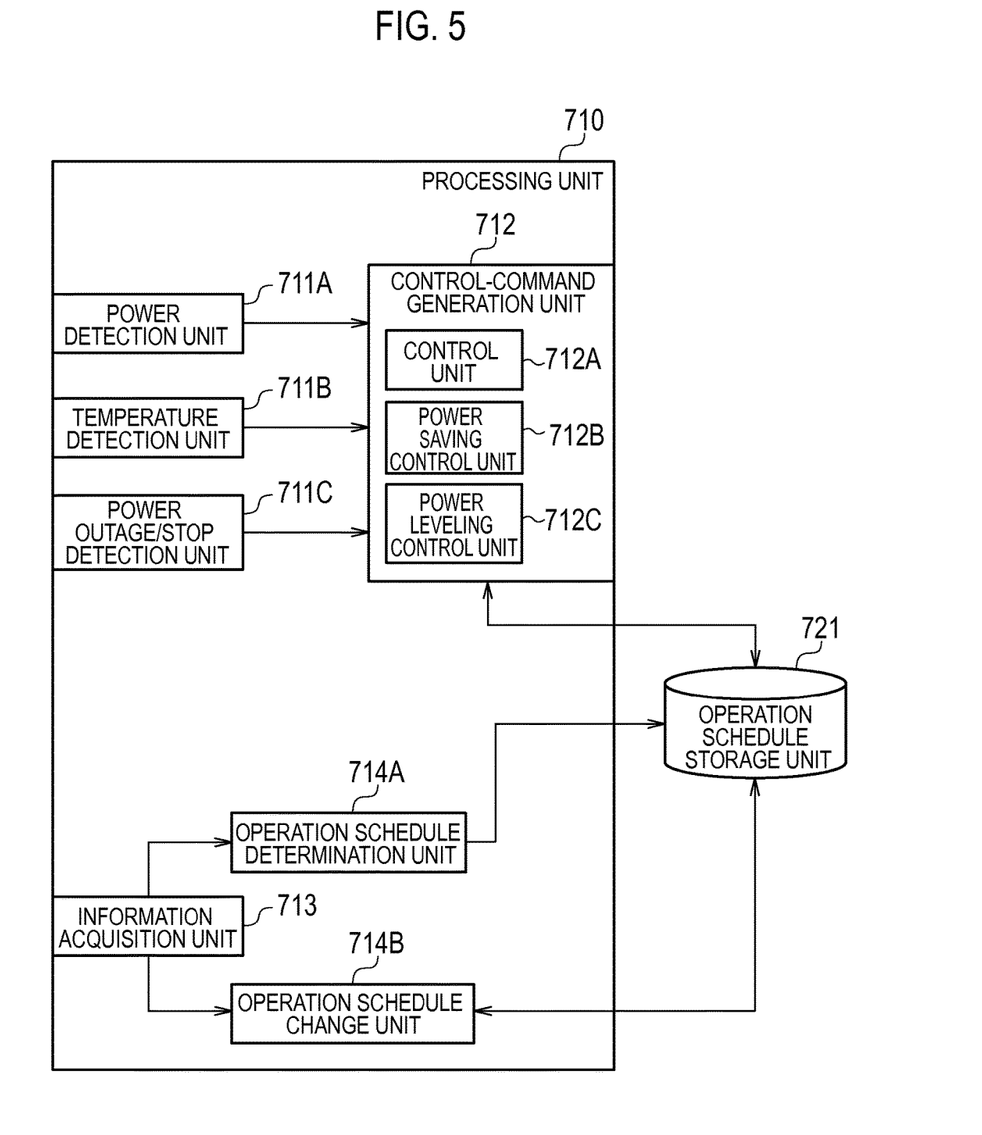
FIG. 5 is the functional block diagram of the processing unit according to the embodiment of the present invention.

FIG. 5 is the functional block diagram of the processing unit 710.

As shown in FIG. 5, the processing unit 710 has a power detection unit 711A, a temperature detection unit 711B, a power outage/stop detection unit 711C, a control-command generation unit 712, an information acquisition unit 713, an operation schedule determination unit 714A, and an operation schedule change unit 714B.

The power detection unit 711A detects a result of summing up the measurement value of the PV generated power and the measurement value of the storage battery-accumulated power among measurement values that the local communication I/F unit 730 receives from the PCS 400, as the power that can be supplied to the load 300 at a start time of the power outage (hereinafter, supply power at the start time of the power outage), and outputs the supply power at the start time of the power outage to the control-command generation unit 712.

The temperature detection unit 711B detects a measurement value of the peripheral temperature of the gas power-generator 220, among measurement values that the local communication I/F unit 730 receives from the PCS 400, and outputs the measurement value of the peripheral temperature to the control-command generation unit 712.

The power outage/stop detection unit 711C detects a power outage notification that the local communication I/F unit 730 receives from the smart meter 600 (or the PCS 400), and outputs the notification to the control-command generation unit 712. Alternatively, the power outage/stop detection unit 711C may detect a power outage notification that the wide area communication I/F unit 740 receives from the external network 2, and output the notification to the control-command generation unit 712.

Also, the power outage/stop detection unit 711C detects a gas power-generation stop notification that the wide area communication I/F unit 740 receives from the PCS 400, and outputs the notification to the control-command generation unit 712. In such cases, the power outage/stop detection unit 711C may detect a stop time of the gas power-generator 220 and output the stop time to the control-command generation unit 712.

The control-command generation unit 712 generates a control command to control each device within the consumer, and transmits the generated control command via the local communication I/F unit 730 to a target device within the consumer.

The control-command generation unit 712 has a control unit 712A, a power saving control unit 712B, and a power leveling control unit 712C.

The control unit 712A corrects the start-up power (standard value) of the gas power-generator 220, on the basis of the peripheral temperature of the gas power-generator 220 or the stop time of the gas power-generator 220. The standard value of the start-up power of the gas power-generator 220 shall be stored in the storage unit 720 in advance. Also, in the storage unit 720, start-up power correction values of each temperature or each stop time are stored in advance, and the control unit 712A corrects the standard value of the start-up power by a correction value that corresponds to the peripheral temperature or stop time of the gas power-generator 220. Then, the control unit 712A uses the start-up power after the correction in the following processing.

The control unit 712A generates a control command to control the charge and discharge of the storage battery 200 such that the supply power at the power outage start time does not fall below the start-up power of the gas power-generator 220, and transmits the control command via the wide area communication I/F unit 740 to the PCS 400.

When the power outage is detected, and when the supply power at the power outage start time does not satisfy the start-up power of the gas power-generator 220, the control unit 712A controls to preferentially charge the storage battery 200 with the power acquired by the power generation of the PV 100 such that the supply power at the power outage start time satisfies the start-up power of the gas power-generator 220.

When the power outage is detected, and when the gas power-generator 220 stops the power generation, the control unit 712A generates a control command to control so as to preferentially supply the supply power at the power outage start time, that is, the PV generated power and the accumulated power, to the gas power-generator 220, and transmits the control command via the local communication I/F unit 730 to the PCS 400 and the distribution board 500.

The power saving control unit 712B generates, at an independent operation start time, a power saving control command for instructing "power saving control" which causes the load 300 to operate in a power saving mode, and transmits the generated power saving control command via the local communication I/F unit 730 to the load 300.

The power leveling control unit 712C generates, at the independent operation start time, a power leveling control command for instructing the above-described power leveling control, and transmits the generated power leveling control command via the local communication I/F unit 730 to the distribution board 500.

The information acquisition unit 713 acquires various type of information (details are described below) for determining a during-independent-operation schedule which is an operation schedule of the load 300 during the independent operation, via the local communication I/F unit 730 and/or the wide area communication I/F unit 740.

The operation schedule determination unit 714A determines the during-independent-operation schedule on the basis of the information acquired by the information acquisition unit 713. The operation schedule determination unit 714A stores the information of the determined during-independent-operation schedule into an operation schedule storage unit 721 provided in the storage unit 720.

The operation schedule change unit 714B changes the during-independent-operation schedule stored in the operation schedule storage unit 721, on the basis of information newly acquired by the information acquisition unit 713, and updates the operation schedule before the change by an operation schedule after the change.

The control-command generation unit 712 generates the control command in accordance with the operation schedule stored in the operation schedule storage unit 721, and transmits the generated control command via the local communication I/F unit 730 to the target apparatus within the consumer.

Figure 6:
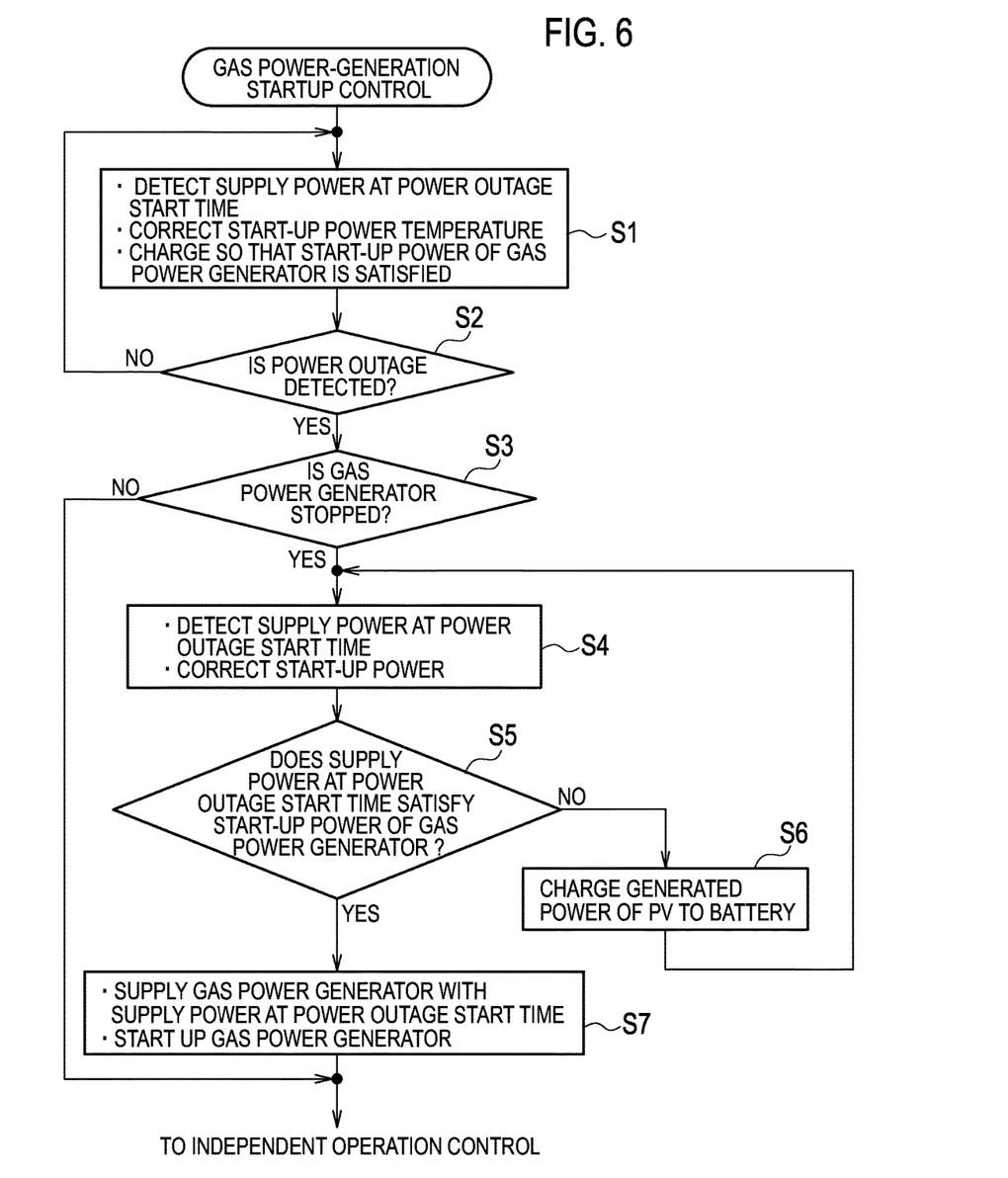
FIG. 6 is a flowchart of the gas power-generation startup control flow by the HEMS according to the embodiment of the present invention.

Next, a gas power-generation startup control flow by the HEMS 700 is described. FIG. 6 is a flowchart of the gas power-generation startup control flow by the HEMS 700.

As shown in FIG. 6, in step S1, the power detection unit 711A detects the result of summing up the measurement value of the PV generated power and the measurement value of the storage battery-accumulated power, as the supply power at the power outage start time. Also, the temperature detection unit 711B detects the measurement value of the peripheral temperature of the gas power-generator 220, or the power outage/stop detection unit 711C detects the stop time of the gas power-generator 220. By detecting this measurement value of the peripheral temperature or this stop time, a current temperature of the gas power-generator 220 can be grasped, and optimum power as the start-up power can be predicted. Concretely, when the first temperature is low, or when the stop time is long, a total start-up power amount becomes large because it requires time to reach a predetermined temperature after the gas power-generator 220 starts up. In the following, the start-up power amount that changes in this manner is described as a "start-up power correction".

After performing the temperature correction of the start-up power of the gas power-generator 220, the control unit 712A generates the control command such that the supply power at the power outage start time satisfies the start-up power after the correction. For example, when the supply power at the power outage start time does not satisfy the start-up power after the correction, the control unit 712A generates the control command that causes an increase in the accumulated power and transmits the command.

In step S2 when the power outage/stop detection unit 711C detects the occurrence of the power outage (step S2; YES), and in step S3 when the power outage/stop detection unit 711C detects the power-generation stop of the gas power-generator 220, the processing proceeds to step S4. When the detection unit does not detect the occurrence of the power outage (step S2; NO), the processing returns to step S1. When the power outage/stop detection unit 711C detects the occurrence of the power outage (step S2; YES), and, in step S3 when the power outage/stop detection unit 711C does not detect the power-generation stop of the gas power-generator 220, the processing proceeds to an independent operation control flow (details are described below).

In step S4, the power detection unit 711A detects the result of summing up the measurement value of the PV generated power and the measurement value of the storage battery-accumulated power, as the supply power at the power outage start time. Also, the temperature detection unit 711B detects the measurement value of the peripheral temperature of the gas power-generator 220. Then, the control unit 712A performs the temperature correction of the start-up power of the gas power-generator 220.

In step S5 when the control unit 712A decides that the supply power at the power outage start time does not satisfy the start-up power after the correction (step S5; NO), in step S6, the control unit 712A generates the control command to perform the control so that the PV generated power is accumulated in the storage battery 200 and transmits the command to the PCS 400. After that, the processing returns to step S4.

On the contrary, in step S5 when the control unit 712A decides that the supply power at the power outage start time satisfies the start-up power after the correction (step S5; YES), in step S7, the control unit 712A generates the control command to perform the control so as to supply the supply power at the power outage start time (the PV generated power and the accumulated power) to the gas power-generator 220 and transmits the command to the PCS 400 and the distribution board 500. Consequently, the gas power-generator 220 starts up. After that, the processing proceeds to the independent operation control flow.

Figure 7:
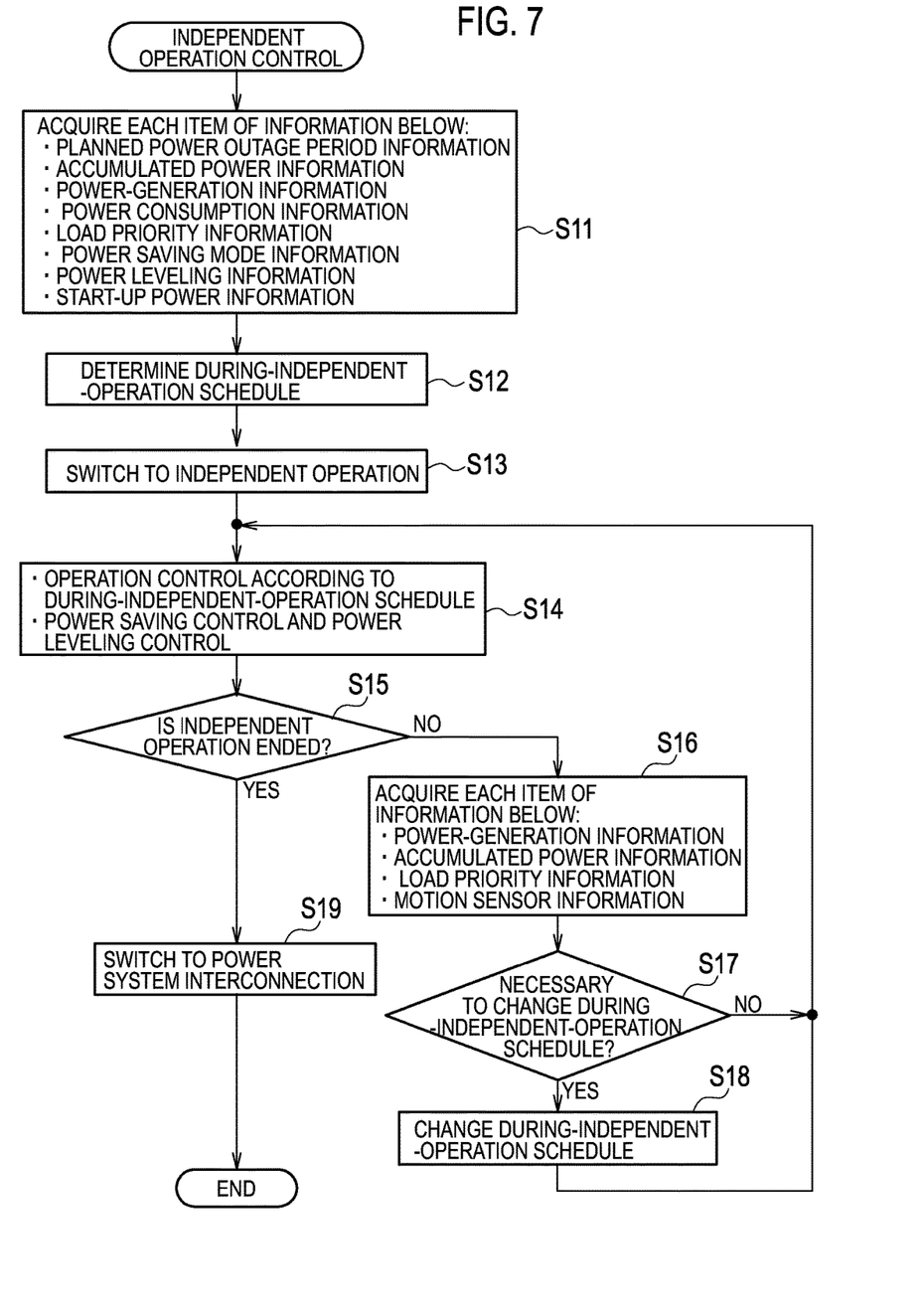
FIG. 7 is a flowchart of the independent operation control flow by the HEMS according to the embodiment of the present invention.

Next, the independent operation control flow by the HEMS 700 is described. FIG. 7 is a flowchart of the independent operation control flow by the HEMS 700.

As shown in FIG. 7, in step S11, the information acquisition unit 713 acquires planned power outage period information, accumulated power information, power-generation information, and power consumption information.

The planned power outage period information is information indicating the planned power outage period defined by scheduled power outages (rotational power outages), and includes, for example, a date corresponding to the planned power outage period, a start time of the planned power outage period, and an end time of the planned power outage period. The information acquisition unit 713 acquires the planned power outage period information via the wide area communication I/F unit 740 from the external network 2, or acquires the planned power outage period information on the basis of a user input to the user I/F unit 750. Alternatively, when the user I/F unit (for example, the input unit 470 shown in FIG. 2) is provided in the PCS 400, the planned power outage period information may be acquired on the basis of the user input to the user I/F unit 750 of the PCS 400. When the smart meter 600 can acquire the planned power outage period information from the external network 2, the planned power outage period information may be acquired via the local communication I/F unit 730 from the smart meter 600.

In the present embodiment, the planned power outage period indicated by the above described planned power outage period information corresponds to a period when the independent operation is performed.

The accumulated power information is information indicating the accumulated power of the storage battery 200 before the power outage (just before the power outage). The information acquisition unit 713 acquires the accumulated power information via the local communication I/F unit 730 from the PCS 400.

The power-generation information is information indicating each generated power of the PV 100 and the gas power-generator 220 before the power outage (immediately before the power outage). The information acquisition unit 713 acquires the power-generation information via the local communication I/F unit 730 from the PCS 400. Alternatively, the information acquisition unit 713 acquires generated power indicating estimated generated-power of the PV 100 during the independent operation, on the basis of information useful for acquiring the estimated generated-power of the PV 100 in the future (during the independent operation). Here, the information useful for acquiring the estimated generated-power is, for example, the following information.

Weather forecast and meteorological sensor: From this information, for example, an amount of solar radiation that influences the power generation of the PV 100 can be estimated, and future generated power can be predicted. The information acquisition unit 713 acquires the weather forecast information and the meteorological sensor information via the wide area communication I/F unit 740 from the external network 2.

A clock or calendar function: From this information, for example, an amount of solar radiation that influences the power generation of the PV 100 can be estimated, and the future generated power can be predicted. The information acquisition unit 713 acquires information of the day's date and the current time from an internal timer of the HEMS 700, or from the external network 2 via the wide area communication I/F unit 740.

Presumption from a power generation amount at the power outage start time: For example, in response to whether the generated power at the power outage start time (at the time of switching to the independent operation) has a tendency to increase or decrease, the future generated power can be predicted.

Past power-generation actual performance data: For example, by storing the generated power for each environmental condition in the storage unit 720, and searching the past generated power corresponding to the current environmental condition, the future generated power can be predicted.

In the present embodiment, the above described accumulated power information and power-generation information correspond to a power supply status of the power supply means.

The power consumption information is information indicating total power consumption of the load 300 before the power outage (immediately before the power outage). The total power consumption of the load 300 can be measured by, for example, the distribution board 500, or the socket to which the load 300 is connected, and the information acquisition unit 713 acquires the power consumption information via the local communication I/F unit 730. Alternatively, as shown in FIG. 2, when the load that should be supplied with the power during the independent operation is limited, it is only necessary to acquire power consumption information about the load. Also, when the load is connected to the socket 440 for the independent operation and the independent operation is performed, information of the load may be acquired manually or automatically, and the power consumption information about the load may be acquired from the acquired information.

Basically, by using the above described planned power outage period information, accumulated power information, power-generation information, and power consumption information, the during-independent-operation schedule can be determined. For example, with the total power capable of being supplied to the load 300 during the power outage (during the independent operation), it is decided how much power as compared to the total power consumption of the load 300 can be supplied, and a schedule that decides a timing in the planned power outage period (independent operation period) at which the power is supplied to the load 300.

Further, the information acquisition unit 713 can determine the during-independent-operation schedule more suitably, by acquiring load priority information, power saving mode information, power leveling information, and start-up power information.

The load priority information is information about a setting of a priority of power supply to the load 300. The information acquisition unit 713 acquires the load priority information on the basis of the user input to the user I/F unit 750. Alternatively, the load priority information about a predetermined priority may be stored in the storage unit 720, and the load priority information may be acquired from the storage unit 720. For example, the HEMS 700 and an emergency light are set to the high priority.

The power saving mode information is information indicating information of the power saving mode of each load 300 (for example, types of the power saving mode and the power consumption at the power saving mode).

The power leveling information is information regarding the power leveling control as shown in FIG. 3 (for example, information of the load 300 that should be subject to the power leveling control).

The start-up power information is information indicating the start-up power of each load 300. For example, after the refrigerator performs an intermittent operation and the like as the power saving mode during the power outage, the temperature of the refrigerator is increased. When the electricity is restored, a large amount of start-up power is required for cooling back again to the original temperature. In this case, the continuous operation for a long time is considered to consume less power. Thus, it is preferable to determine the schedule in the light of the start-up power information (if acquirable, also such as an internal temperature of the refrigerator).

In step S12, the operation schedule determination unit 714A determines the during-independent-operation schedule on the basis of the planned power outage period information, the accumulated power information, the power-generation information, the power consumption information, the load priority information, the power saving mode information, the power leveling information, and the start-up power information that are acquired by the information acquisition unit 713. For example, by the total power capable of being supplied to the load 300 during the power outage (during the independent operation), it is decided how much power as compared to the load total power consumption can be supplied, taking into account the power saving control and the power leveling control, and also in light of the priority and the start-up power of the load 300, and the schedule that decides a timing in the planned power outage period (independent operation period) at which the power is supplied and the loads to the power is supplied.

As a concrete example, after inputting the planned power outage period as two hours, the independent operation schedule of the load to be determined on the basis of the accumulated power information and the power-generation information is shown in Table 1. In this manner, the schedule may be made such that a sum total of the start-up power amount of the gas power-generator and a load power consumption amount does not exceed the power-generation amounts of the storage battery and the photovoltaic cell. Note that, when performing the switching every thirty minutes, the "power leveling control" described in FIG. 3 may be performed.

TABLE 1

| <POWER OUTAGE PERIOD> | | | | |
|---|---|---|---|---|
| 2 HOURS | | | | |

| <POWER SUPPLY> | | | | |
|---|---|---|---|---|
| | SUPPLY DEVICE | | SUPPLY POWER | CONTINUED TIME |
| | PHOTOVOLTAIC CELL | | 400 W | 1 HOUR (ESTIMATED) |
| | BATTERY | | 500 W | 1.5 HOURS |
| | GAS POWER GENERATOR | | 700 W | AFTER 0.5 HOURS |

| <POWER CONSUMPTION> | | | | |
|---|---|---|---|---|
| PRIORITY | LOAD NAME | POWER CONSUMPTION DURING NORMAL TIME | POWER CONSUMPTION DURING POWER SAVING MODE | OPERATION TIME (FROM START TIME) |
| 1 | GAS POWER GENERATOR | 300 W | 300 W | 0 to 0.5 HOURS |
| 2 | POWER CONTROL SYSTEM(E.G., HEMS) | 100 W | 100 W | 0 to 2.0 HOURS |
| 3 | LIGHTING | 800 W | 100 W (EMERGENCY LIGHT TAKES PRIORITY) | 0 to 2.0 HOURS |
| 4 | REFRIGERATOR | 1 KW | 400 W | 0 to 1.0 HOUR 1.5 to 2.0 HOURS |
| 5 | AIR CONDITIONER | 2 KW (COOLING, 25° C.) | 500 W (DEHUMIDIFICATION, 28° C.) | 0.5 to 1.5 HOURS |
| 6 | TELEVISION | 300 W | 200 W | 0.5 to 1.5 HOURS |
| 7 | HEAT ACCUMULATOR | 3 KW | — | — |

The operation schedule storage unit 721 stores the during-independent-operation schedule determined by the operation schedule storage unit 721.

In step S13, the control-command generation unit 712 generates a switching command to the independent operation, and transmits the generated switching command via the local communication I/F unit 730 to the PCS 400 and the distribution board 500. Alternatively, the distribution board 500 may automatically perform the switching to the independent operation, and the user may manually perform the switching to the independent operation by connecting the load 300 to the socket 440 for the independent operation.

motion sensor is provided within the consumer. For example, it can be thought that the motion sensor is provided in every room, and the operation schedule of the lighting and the air conditioner and the like is changed in response to whether the user is in the room or not.

As a concrete example, when one hour has passed since the operation started according to the independent operation schedule in Table 1, the changed independent operation schedule when the power-generation information is acquired again and the cellular phone is charged hastily, is shown in Table 2.

TABLE 2

<POWER SUPPLY>

| SUPPLY DEVICE | SUPPLY POWER | CONTINUED TIME |
|---|---|---|
| PHOTOVOLTAIC CELL | 0 W | — |
| BATTERY | 400 W | 0.5 HOURS |
| GAS POWER GENERATOR | 700 W | 1.0 HOURS |

<POWER CONSUMPTION>

| PRIORITY | LOAD NAME | POWER CONSUMPTION DURING NORMAL TIME | POWER CONSUMPTION DURING POWER SAVING MODE | OPERATION TIME (FROM START TIME) |
|---|---|---|---|---|
| 1 | GAS POWER GENERATOR | 300 W | 300 W | — |
| 2 | POWER CONTROL SYSTEM(E.G., HEMS) | 100 W | 100 W | 1 to 2.0 HOURS |
| 3 | LIGHTING | 800 W | 100 W (EMERGENCY LIGHT TAKES PRIORITY) | 1 to 2.0 HOURS |
| 4 | REFRIGERATOR | 1 KW | 400 W | 1.5 to 2.0 HOURS |
| 5 | CELLULAR PHONE | | 50 W | 1.0 to 1.5 HOURS |
| 5=>6 | AIR CONDITIONER | 2 KW (COOLING, 25° C.) | 500 W (DEHUMIDIFICATION, 28° C.) | 1.0 to 1.5 HOURS |
| 6=>7 | TELEVISION | 300 W | 200 W | 1.0 to 1.5 HOURS |
| 7=>8 | HEAT ACCUMULATOR | 3 KW | — | — |

In step S14, the control-command generation unit 712 transmits the control command according to the during-independent-operation schedule information stored in the operation schedule storage unit 721, via the local communication I/F unit 730, to the load 300, the PCS 400, and the distribution board 500.

When the independent operation is terminated due to the lapse of the planned power outage period, the operation is switched to the power system interconnection (step S19), and the present flow is terminated. On the contrary, when the independent operation is continued (step S15; NO), in step S16, the information acquisition unit 713 acquires again the accumulated power information, the power-generation information, and the load priority information. Acquiring again the accumulated power information and the power-generation information is for changing the during-independent-operation schedule, if there is an error in the current accumulated power and the current generated power as compared to an initial expectation. Acquiring again the load priority information is for allowing an interrupt of the load that is not scheduled, such as a case where a charge of a cellular phone is required. Also the information acquisition unit 713 may acquire motion sensor information when a In step S17, the operation schedule change unit 714B decides, on the basis of the accumulated power information, the power-generation information, the load priority information, and the motion sensor information acquired by the information acquisition unit 713, whether the operation schedule change unit 714B changes the during-independent-operation schedule stored in the operation schedule storage unit 721 or not.

When the operation schedule change unit 714B decides not to change the during-independent-operation schedule (step S17; NO), the processing is returned to step S14.

When the operation schedule change unit 714B decides to change the during-independent-operation schedule (step S17; YES), in step S18, the operation schedule change unit 714B changes the during-independent-operation schedule stored in the operation schedule storage unit 721, and the processing is subsequently returned to step S14.

As described above, the power generation by the gas power-generator 220 can be started during the power outage, because the control unit 712A can retain the start-up power of the gas power-generator 220 by controlling the charge and discharge of the storage battery 200 such that the supply power capable of being supplied to the load 300 does not fall below the start-up power of the gas power-generator 220.

Also, in the present embodiment, when the power outage is detected and when the gas power-generator 220 stops the power generation, the power generation by the gas power-generator 220 can be started just after the power outage by supplying the supply power capable of being supplied to the load 300 to the gas power-generator 220 preferentially.

Further, in the present embodiment, by deciding the start-up power of the gas power-generator 220 on the basis of the peripheral temperature or the stop time of the gas power-generator 220, the gas power-generator 220 in which the start-up power changes in response to the temperature can be started up more surely.

In the present embodiment, when the power outage is detected and when the supply power capable of being supplied to the load 300 does not satisfy the start-up power of the gas power-generator 220, the gas power-generator 220 can be started up early by charging the storage battery 200 with the generated power of the PV 100 preferentially such that the supply power capable of being supplied to the load 300 satisfies the start-up power of the gas power-generator 220.

In the present embodiment, the operation schedule determination unit 714A can appropriately determine the operation schedule of the load 300 during the power outage (that is, during the independent operation), by determining the during-independent-operation schedule, on the basis of the period when the independent operation is performed, the power supply status of the power-generator and the storage battery 200, and a status of the load 300.

In the present embodiment, the operation schedule determination unit 714A can determine the operation schedule of the load 300 during the power outage (that is, during the independent operation) at a suitable timing, by determining the during-independent-operation schedule, at the independent operation start time.

Further, in the present embodiment, the operation schedule determination unit 714A can determine the during-independent-operation schedule according to the most recent status, by determining the during-independent-operation schedule, on the basis of the period when the independent operation is performed, the power supply status of the power-generator and the storage battery 200 before determining the during-independent-operation schedule, and the status of the load 300 before determining the during-independent-operation schedule.

In the present embodiment, the operation schedule determination unit 714A can supply the power to the load 300 at an appropriate priority, by determining the during-independent-operation schedule further on the basis of the setting of the power supply priority to the load 300.

In the present embodiment, the operation schedule determination unit 714A can appropriately determine the during-independent-operation schedule in view of the power saving control during the independent operation, by determining the during-independent-operation schedule further on the basis of the power saving control.

In the present embodiment, the operation schedule determination unit 714A can appropriately determine the during-independent-operation schedule in view of the power leveling control during the independent operation, by determining the during-independent-operation schedule further on the basis of the power leveling control.

In the present embodiment, the operation schedule change unit 714B can appropriately change the during-independent-operation schedule during the independent operation, by changing at least a part of the determined during-independent-operation schedule, on the basis of at least one of the power supply status of the power-generator and the storage battery 200 during the independent operation, the status of the load 300 during the independent operation, or a status of the user during the independent operation.

In the above described embodiment, the configuration where the PV 100, the gas power-generator 220, and the storage battery 200 are provided in the consumer is described. However, a configuration may be applicable where the PV 100 or the storage battery 200 is not provided in the consumer. Also, in addition to the PV 100, or in place of the PV 100, a configuration may be applicable where a wind power-generator is provided in the consumer. Note that, the PV 100 and the wind power-generator correspond to a second power-generator that does not require the start-up power for starting the power-generation. Further, in addition to the gas power-generator 220, or in place of the gas power-generator 220, the first power-generator may be a device that requires the electrical power at an initial driving and generates the electrical power by receiving supply other than the electrical power (resources other than gas such as oil) after the driving.

In the above described embodiment, the HEMS 700 for performing the power management on a house basis is described as an example. However, in place of the HEMS 700, BEMS may also be performing the power management on a building basis.

Also, at least a part of the configuration of the HEMS 700 shown in FIG. 5 may be provided in the controller 430 of the PCS 400, and at least a part of the processing flow shown in FIG. 6 and FIG. 7 may be performed by the controller 430 of the PCS 400. That is, the PCS 400 may be the control device according to the present invention.

In the flow shown in FIG. 7, the during-independent-operation schedule is determined before switching to the independent operation. However, the during-independent-operation schedule may be determined after switching to the independent operation.

As described above, it must be understood that the present invention includes various embodiments and the like that are not described herein.

Note that the entire content of the Japanese Patent Application No. 2011-092528 (filed on Apr. 18, 2011) is incorporated herein by reference.

INDUSTRIAL APPLICABILITY

As described above, a control device, a power control system, and a power control method according to the present invention is useful in electronics, with which it is possible to start the power generation during the power outage by a power-generator requiring the start-up power.

The invention claimed is:

1. A control device provided in a consumer having a fuel cell apparatus requiring a predetermined start-up power for starting power generation and a power supplier supplying power to a load, and controlling the fuel cell apparatus and the power supplier, comprising:
   a power detector configured to detect supply power that can be supplied by the power supplier; and
   a controller configured to correct the predetermined start-up power based on at least one of a temperature of the fuel cell apparatus and a stop time of the fuel cell apparatus and to control the power supplier to supply a controlled supply power such that the controlled supply power does not fall below the corrected start-up power of the fuel cell apparatus, wherein when a power outage is detected and when the fuel cell apparatus is in a stop state not generating power, the controller controls the power supplier to supply the controlled supply power to the fuel cell apparatus.

2. The control device according to claim 1, comprising:
an operation schedule determination unit configured to determine a during-independent-operation schedule that is an operation schedule of the load during an independent operation, when the power outage is detected and when the independent operation by the power supplier and the fuel cell apparatus is performed, wherein
the operation schedule determination unit determines the during-independent-operation schedule, on the basis of a period when the independent operation is performed, each power supply status of the power supplier and the fuel cell apparatus, and a status of the load.

3. The control device according to claim 1, wherein the power supplier includes a storage battery configured to store the power to be supplied to the load, the controlled supply power includes accumulated power stored in the storage battery, and the controller controls a charge and discharge of the storage battery such that the controlled supply power including the accumulated power does not fall below the corrected start-up power of the fuel cell apparatus.

4. The control device according to claim 3, wherein the power supplier includes a second power-generator that requires no power for starting the power generation, and when the power outage is detected and when the supply power does not satisfy the corrected start-up power, the controller controls the power acquired by the power generation of the second power-generator to be charged to the storage battery such that the controlled supply power satisfies the corrected start-up power.

5. The control device according to claim 1, wherein the fuel cell apparatus includes at least any of an auxiliary machine and a heater, and the controller controls the power supplier such that the controlled supply power is supplied to at least any of the auxiliary machine and the heater.

6. The control device according to claim 1, wherein the controller controls the power supplier to supply the supply power to the fuel cell apparatus before supplying the supply power to the load, when the power outage is detected and when the fuel cell apparatus is in the stop state.

7. A power control system provided in a consumer having a fuel cell apparatus requiring a predetermined start-up power for starting power generation and power supplier for supplying power to a load, and having a control device that controls the fuel cell apparatus and the power supplier, comprising:
a power detector configured to detect supply power that can be supplied by the power supplier; and
a controller configured to correct the predetermined start-up power based on at least one of a temperature of the fuel cell apparatus and a stop time of the fuel cell apparatus and to control the power supplier to supply a controlled supply power such that the controlled supply power does not fall below the corrected start-up power of the fuel cell apparatus, wherein
when a power outage is detected and when the fuel cell apparatus is in a stop state not generating power, the controller controls the power supplier to supply the controlled supply power to the fuel cell apparatus.

8. The power control system according to claim 7, wherein the controller controls the power supplier to supply the supply power to the fuel cell apparatus before supplying the supply power to the load, when the power outage is detected and when the fuel cell apparatus is in the stop state.

9. A power control method of controlling a fuel cell apparatus and power supplier, in a consumer having the fuel cell apparatus that requires a predetermined start-up power for starting power generation and the power supplier for supplying power to a load, comprising steps of:
(a) detecting supply power that can be supplied by the power supplier,
(b) correcting the predetermined start-up power based on at least one of a temperature of the fuel cell apparatus and a stop time of the fuel cell apparatus,
(c) controlling the power supplier to supply a controlled supply power such that the controlled supply power does not fall below the corrected start-up power of the fuel cell apparatus, when a power outage is detected and when the fuel cell apparatus is in a stop state not generating power.

10. The power control method according to claim 9, wherein the controlling is performed before supplying the supply power to the load, when the power outage is detected and when the fuel cell apparatus is in the stop state.

* * * * *